United States Patent
Iimori

(10) Patent No.: US 6,393,282 B1
(45) Date of Patent: May 21, 2002

(54) MOBILE RADIO COMMUNICATION TERMINAL DEVICE WITH BASE STATION SEARCHING FUNCTION

(75) Inventor: Eiji Iimori, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/659,586

(22) Filed: Sep. 11, 2000

Related U.S. Application Data

(63) Continuation of application No. PCT/JP00/00152, filed on Jan. 14, 2000.

(30) Foreign Application Priority Data

Jan. 14, 1999 (JP) ............................................ 11-008134

(51) Int. Cl.⁷ ................................................. H04Q 7/20
(52) U.S. Cl. ...................... 455/432; 455/440; 455/441; 455/436; 455/442
(58) Field of Search ................................ 455/436, 432, 455/440, 441, 442, 434, 412, 422, 574; 370/331

(56) References Cited

U.S. PATENT DOCUMENTS

| | | | | |
|---|---|---|---|---|
| 5,787,348 A | * | 6/1998 | Willey et al. ................ | 455/441 |
| 5,867,785 A | * | 5/1999 | Averbuch et al. ........... | 455/436 |
| 5,907,808 A | * | 5/1999 | Vaara et al. ................. | 455/441 |
| 5,913,168 A | * | 6/1999 | Moreau et al. .............. | 455/441 |
| 5,963,870 A | * | 10/1999 | Chheda et al. .............. | 455/522 |
| 5,983,104 A | * | 11/1999 | Wickman et al. ............ | 455/441 |
| 5,995,835 A | * | 11/1999 | De Seze et al. ............. | 455/436 |
| 6,011,971 A | * | 1/2000 | Jolma .......................... | 455/438 |
| 6,038,444 A | * | 3/2000 | Schipper et al. ............. | 455/421 |
| 6,085,091 A | * | 6/2000 | Yoo et al. .................... | 455/441 |
| 6,192,245 B1 | * | 2/2001 | Jones et al. .................. | 455/437 |

FOREIGN PATENT DOCUMENTS

| | | |
|---|---|---|
| GB | 2 314 435 | 12/1997 |
| JP | 1-303817 | 12/1989 |
| JP | 5-63636 | 3/1993 |
| JP | 7-312771 | 11/1995 |
| JP | 8-154265 | 6/1996 |
| JP | 8-331628 | 12/1996 |

* cited by examiner

Primary Examiner—William Trost
Assistant Examiner—Marlean Milord
(74) Attorney, Agent, or Firm—Finnegan, Henderson, Farabow, Garrett & Dunner, L.L.P.

(57) ABSTRACT

The history of handover destinations is stored in a handover history storage section. Each time handover is effected, the history of past five consecutive handover destinations including the present handover destination is determined on the basis of the handover history storage section. When any of the handover destinations has been stored in the handover history storage section, the mobile station recognizes its state to be in the steady state and otherwise to be in the moving state. On the basis of the result of the recognition, the mobile station selects a search algorithm suitable for each state and searches for a base station. This enables the best base station to be searched for according to the state of the mobile station, thereby reducing the power consumption in the wait state, which lengthens the battery service life.

18 Claims, 7 Drawing Sheets

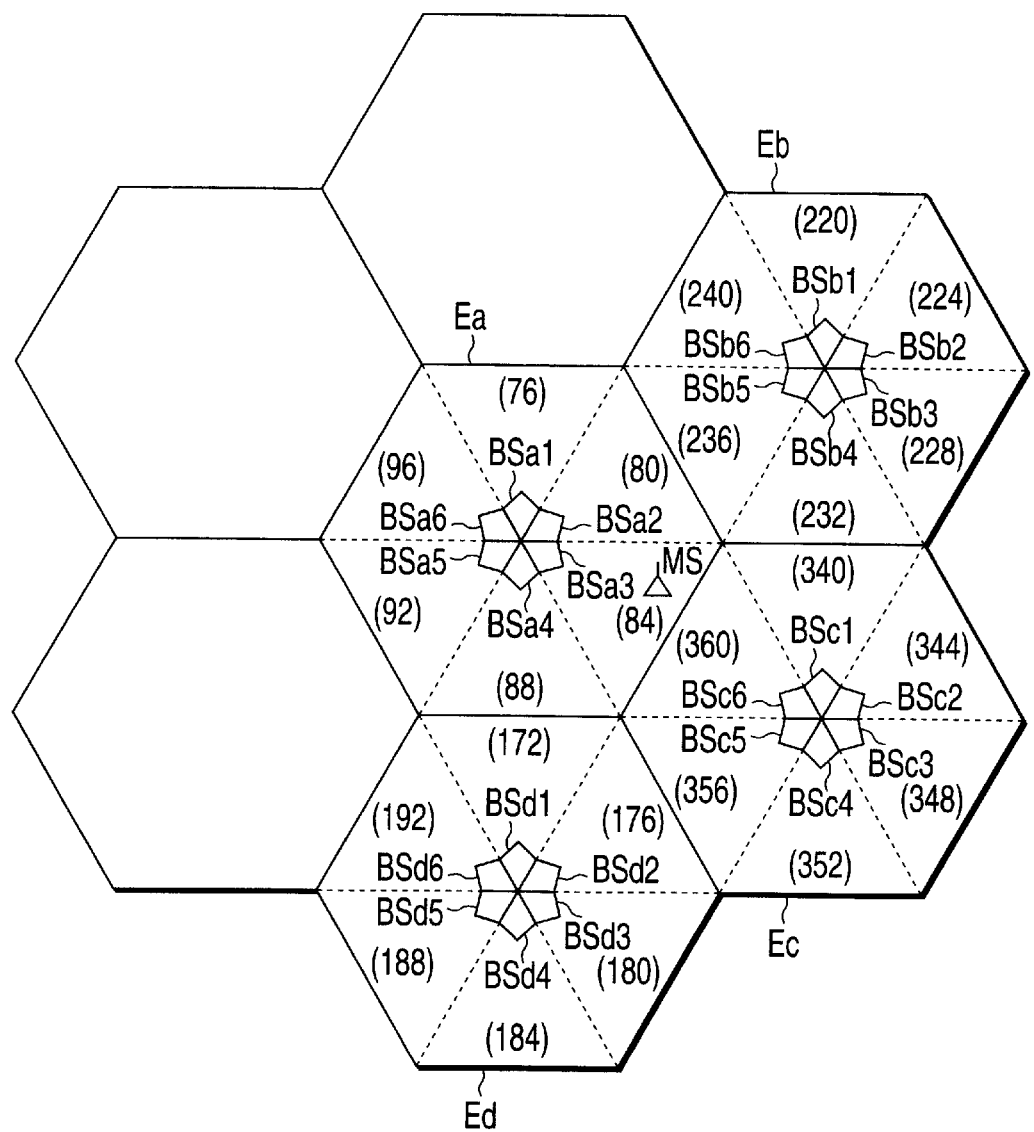
F I G. 1

| FIRST MEMORY PN OFFSET |
|---|
| 80 |
| 84 |
| 88 |
| 172 |
| 236 |

FIG. 5A

| SECOND MEMORY PN OFFSET |
|---|
| 172 |
| 80 |
| 84 |
| 88 |
| 236 |

FIG. 5B

EXAMPLE OF NEIGHBOR LIST MESSAGE

| 80 | 88 | 76 | 92 | 236 | 232 | 172 | 176 | 96 |
| 360 | 356 | 240 | 192 | 76 | 340 | | | |

FIG. 6

MOBILE RADIO COMMUNICATION TERMINAL DEVICE WITH BASE STATION SEARCHING FUNCTION

CROSS REFERENCE TO RELATED APPLICATIONS

This is a continuation of Application No. PCT/JP00/00152, filed Jan. 14, 2000.

This application is based upon and claims the benefit of priority from the prior Japanese Patent Application No. 11-008134, filed Jan. 14, 1999, the entire contents of which are incorporated herein by reference.

BACKGROUND OF THE INVENTION

This invention relates to a mobile radio communication terminal device used in a cellular radio communication system which forms cells as an automobile telephone system, a portable telephone system, or a radio communication LAN system does.

In recent years, cellular radio communication systems have been popularized. In the cellular radio communication system, base stations are distributed over a service area, each base station forms a radio zone called a cell, and a base station and a mobile station are connected by radio in each cell. In this type of system, when the power supply of a mobile station is turned on, the mobile station is first synchronized with the nearest base station and then connected to the latter. Thereafter, the process of switching the base station to which the mobile station is connected, what is called handover, is carried out as the mobile station moves.

For example, in a cellular radio communication system using a CDMA (Code Division Multiple Access) scheme complying with the U.S. TIA standard (IS-95A), when the power supply is turned on at a mobile station, the mobile station tries to pick up the pilot signal broadcast from a base station. It takes about one to two seconds to pick up the pilot signal. This is where the time is required most in the sequence for establishing the system synchronization between the mobile station and base station. After the pilot signal has been picked up, the mobile station establishes the PN code synchronization with the base station and then switches the Walsh code, orthogonal code, thereby receiving a sync channel transmitted from the base station. After receiving the message transmitted through the sync channel, the mobile station demodulates it and stores the received message. The message includes inherent information about the base station and network.

After having completed the synchronization establishing sequence, the mobile station goes into the wait state. In the wait state, the mobile station causes the radio communication circuit section to operate only in the receiving period for a slot where the base station will possibly send a page message to the mobile station and prevents the main clock from being generated in the remaining period to disable the radio communication circuit section. The disabled state is called a sleep state. Such a battery saving operation is called the slot mode operation, whereby the average drawn current of the mobile station is reduced to lengthen the battery service life.

In the wait state, the mobile station not only receives the page message transmitted through the paging channel from the base station to which the mobile station is now being connected, in every receiving period for a slot where the mobile station should receive, but also searches for neighboring base stations in preparation for handover. The base station now being connected reports information about the neighboring base stations to be searched for in the form of a neighbor list message. The neighbor list message is such that the PN offset values of the neighboring base stations are arranged in the order in which they are closer to the base station that transmits the neighbor list message. On the basis of the neighbor list message, the mobile station chooses, for example, three stations in each receiving period for a slot where the mobile station should receive, thereby searching for neighboring base stations.

When neighboring base stations are searched for while the slop mode operation is being carried out, it takes a very long time to complete the search of all the neighboring base stations, because the number of neighboring base stations that can be searched for in a single slot receiving period is as small as about three. Therefore, of the results of searching for all the neighboring base stations, the oldest one is most likely to be unsuitable for the state of the present mobile station. For this reason, if handover were executed with the result of the search being regarded as reliable, the recapture or handover of the pilot signal would fail and the system lost might occur. If the system lost has occurred once, the mobile station starts the operation of establishing the synchronization of the PN code again from scratch as described above. As a result, it takes a very long time for the mobile station to go into the wait state again. In the meantime, the operating current flows in full, thus impairing the battery saving effect in the slot mode operation.

To overcome this problem, when a conventional mobile station has determined that handover is needed, it searches for all the neighboring base stations specified by the neighbor list message again at that time. Then, on the basis of the result of the search, the mobile station chooses the best handover destination and effects handover. It takes as a long time as about several hundred milliseconds to search for all the neighboring base stations again from scratch. Moreover, in the cellular mobile radio communication system, to connect a mobile station to the best base station at all times, the mobile station is generally designed to determine that handover is necessary even when the reception level from the base station now being connected drops slightly. Each time such a determination is made, the mobile station searches for all the neighboring base stations. As a result, the drawn current is still large in the wait state, which makes it difficult to lengthen the continuously using time of the mobile station.

BRIEF SUMMARY OF THE INVENTION

It is, accordingly, a first object of the present invention to provide a mobile radio communication terminal device capable of determining accurately whether a mobile station in the wait state is in a steady state or a moving state.

A second object of the present invention is to provide a mobile radio communication terminal device which enables the best base station to be searched for according to the state of a mobile station and thereby reduces the drawn current in the wait state to lengthen the battery service life.

To achieve the first object of the invention, in a cellular mobile radio communication system where base stations are distributed over a service area, the base stations form their respective radio areas, and a radio channel connects a mobile station and a base station in each of the radio areas, a mobile radio communication terminal device used as the mobile station characterized by comprising: history information storage means for storing information relating to past handovers representing base stations connected to the mobile radio communication terminal device as handover history information; update means for updating the handover history information stored in the history information storage means each time handover is performed; and state determining means for determining whether the mobile radio communication terminal device is in a steady state or a moving state, on the basis of the handover history information stored in the history information storage means.

A concrete configuration of the state determining means is as follows. Each time handover is effected, the state determining means determines whether any of the base stations to which a specific number of past consecutive handovers including the present handover were connected became a handover destination base station in the past, on the basis of the handover history information stored in the history information storage means. When determining that any of the base stations became a handover destination base station, the state determining means recognizes its own mobile radio communication terminal device to be in the steady state. In contrast, when determining that at least one of the base station did not become a handover destination base station, the state determining means recognizes its own mobile radio communication terminal device to be in the moving state.

Therefore, with the present invention, since the present state of its own station is determined by tracing the history of past handovers, it is possible to determine accurately with relative ease whether its own station is now in the moving state or is now stationary or in a limited range even when moving, or in what is called a steady state.

To accomplish the second object of the present invention, the mobile radio communication terminal device is characterized by, in addition to the history information storage means and state determining means, further comprising base station searching means for selecting a different algorithm, depending on either the steady state or the moving state, according to the result of the determination by the state determining means and searches for a base station.

The configuration of the base station searching means is as follows.

In the steady state, the base station searching means classifies a first number of base stations in the handover destination base stations stored in the history information storage means into a first search group and a second number of the other base stations larger than the first number into a second search group and searches the first search group more frequently than the second search group.

In the moving state, the base station searching means selects a third number of neighboring base stations closer in distance to the base station now being connected on the basis of a list of neighboring base stations reported from the base station to which its own station is now being connected, classifies not only these neighboring base stations into a third search group but also the other neighboring base stations in the list into a fourth search group, and searches the third search group more frequently than the fourth search group.

Therefore, with the present invention, use of a search algorithm suitable for the characteristic in each of the steady state and moving state enables a base station to be searched for efficiently.

For example, because in the steady state, the mobile station is either stationary or moving slowly in a limited range, the number of base stations that will possibly become handover destinations is about three to four at most. Therefore, in the steady state, just searching for a limited number of base stations during handover enables a suitable base station to be found as the handover destination. Consequently, as compared with the case where a large number of neighboring base stations are searched for unconditionally, a suitable handover destination can be found in a shorter search time. This shortens the search time, reducing the power consumption that much, which lengthens the battery service life.

In contrast, in the moving state, the base station most suitable for the handover destination changes dynamically. Because of this, in the moving state, neighboring base stations are searched for over a relatively wide range during handover according to the neighbor list message reported from the base station now being connected, thereby making it possible to find a suitable base station as the handover destination with a high probability.

Furthermore, the base station searching means is characterized by including means for determining whether handover is needed and, when the determining means determines that handover is not needed, searching for each base station belonging to the first search group and each base station belonging to the second search group alternately.

In addition, the base station searching means is characterized by, when the determining means determines that handover is not needed, searching for the third number of neighboring base stations belonging to the third search group and the fourth number of neighboring base stations smaller than the third number selected from the fourth search group alternately.

With this configuration, in each reception slot, not only each base stations in the first or third search group but also each base stations in the second or fourth search group can be searched for. This prevents the result of searching for the base stations in the second or fourth search group from becoming too old. Thus, when handover is needed, a suitable handover destination can be found with a relatively high probability.

Furthermore, the base station searching means is characterized by including necessity determining means for determining whether handover is needed and, when the necessity determining means determines that handover is needed, searching for all the base stations belonging to the first or third search group and by, when a suitable base station could not be found as the result of the search, searching for each base station belonging to the second and fourth search group.

With this configuration, when a suitable base station has been found as the handover destination as the result of searching for base station belonging to the first or third search group, the second or fourth search group need not be searched. Therefore, as compared with the case where all the search groups are searched unconditionally, the average search time is shortened, making shorter the time required for the handover process. This reduces the power consumption that much, which lengthens the battery service life.

Still furthermore, the base station searching means is characterized by, when a suitable base station could not be found as the handover destination as the result of the search of the first or third search group, causing the necessity determining means to determine again whether handover is needed and by, only when the determination has shown that handover is needed, searching the second or fourth search group.

With this configuration, when it is determined whether the quality of the reception from the base station now being connected is restored, after the search of the first or third search group, and handover is no longer needed because of the restoration of the reception quality, the mobile station can return to the sleep state without searching the second or fourth search group. Therefore, as compared with the case where the search of all the search groups is continued unconditionally, a useless search operation is eliminated, thus reducing the power consumption that much, which lengthens the battery service life.

Still furthermore, the base station searching means is characterized by, when a suitable base station could not be found as the handover destination as the result of searching the first or third search group and the second or fourth search group, searching the first or third search group and the second or fourth search group repeatedly and by, when the number of the repetitions has reached a predetermined number of times, performing variable control of the determination conditions of the means for determining whether handover is needed.

With this configuration, when a possibility of handover is checked excessively because the condition for determining whether handover is needed has not been optimized, the handover determination condition can be corrected automatically to the optimum condition. As a result, a base station is searched for only when handover is really needed, reducing the power consumption, which lengthens the battery service life.

Additional objects and advantages of the invention will be set forth in the description which follows, and in part will be obvious from the description, or may be learned by practice of the invention. The objects and advantage s of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows an embodiment of the cell configuration of a cellular mobile radio communication system according to the present invention;

FIG. 5A shows an example of the structure of a first memory used in determining the state of a mobile station;

FIG. 5B shows an example of the structure of a second memory used in determining the state of a mobile station;

FIG. 6 shows an example of a neighbor list message;

DETAILED DESCRIPTION OF THE INVENTION

Hereinafter, referring to the accompanying drawings, embodiments of the present invention will be explained in detail.

FIG. 1 shows a cell configuration of a CDMA cellular mobile radio communication system according to an embodiment of the present invention.

In the system, a large number of cells Ea, Eb, Ec, Ed, . . . are formed in a service area. In these cells Ea, Eb, Ec, Ed, . . . , six base stations BSa1 to BSa6, BSb1 to BSb6, BSc1 to BSc6, BSd1 to BSd6, . . . are provided respectively. Each of the six base stations has directivity in the direction of transmission and reception of radiowaves and covers the six sectors formed by dividing each cell.

PN offsets (76), (80), (84), . . . differing from each other are given to the base stations BSa1 to BSa6, BSb1 to BSb6, BSc1 to BSc6, BSd1 to BSd6, . . . A mobile radio communication terminal device (hereinafter, referred to as a mobile station) MS synchronizes the generation start timing of its own PN code with the PN offset given to the base station in the sector where the mobile station exists, thereby enabling CDMA communication with the base station.

Figure 2:
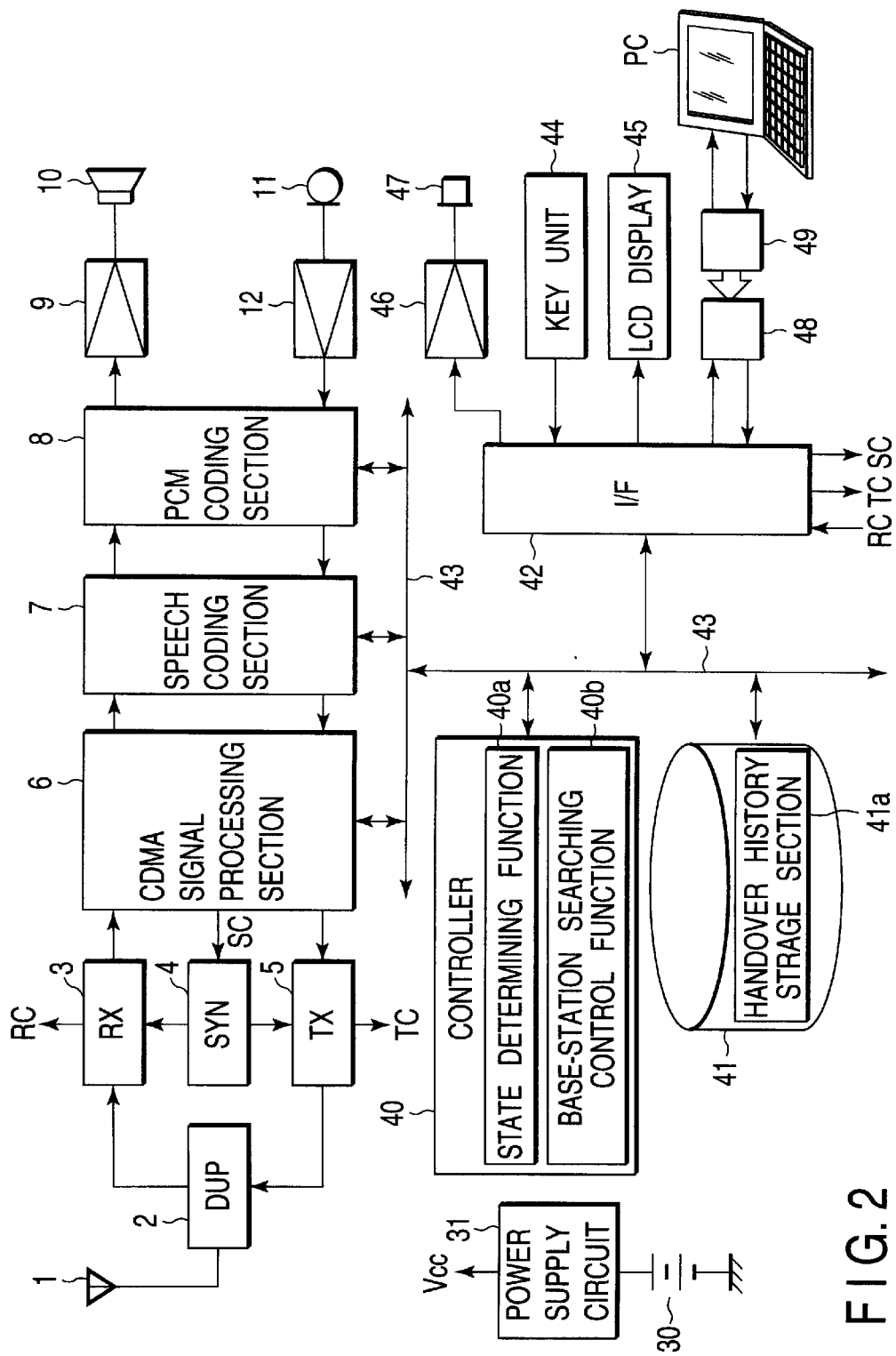
FIG. 2 is a circuit block diagram of an embodiment of a mobile radio communication terminal device according to the present invention.

On the other hand, the mobile station MS is constructed as follows. FIG. 2 is a circuit block diagram showing the configuration of the mobile station.

In the figure, after the radio frequency signals transmitted from the base stations BSa1 to BSa6, BSb1 to BSb6, BSc1 to BSc6, BSd1 to BSd6, . . . are received by an antenna 1, they are inputted via an antenna duplexer (DUP) 2 to a reception circuit (RX) 3. In the reception circuit 3, the radio frequency signal is mixed with the reception local oscillating signal outputted from a frequency synthesizer (SYN) 4 and frequency-converted into an intermediate frequency signal. The reception circuit 3 is provided with a reception electric-field strength sensor. The data RC on the reception electric-field strength sensed by the reception electric-field strength sensor is inputted to an input/output interface (I/F) 42. The input/output interface 42 inputs the data RC via a bus 43 to a controller 40.

The controller 40 specifies the frequency of the reception local oscillating signal generated by the frequency synthesizer 4. Specifically, the frequency control signal SC outputted from the controller 40 is transferred via the bus 43 to the input/output interface 42. The input/output interface 42 then supplies the frequency control signal to the frequency synthesizer 4.

In a CDMA signal processing section 6, the reception intermediate frequency signal is subjected to orthogonal demodulation and then to inverse diffusion using the diffusion code (PN code) allocated to the reception channel, thereby converting the reception intermediate frequency signal into the demodulation data in a specific format according to the data rate. The converted demodulation data is inputted to a speech coding section 7. Of the reception data, the control data representing the data rate is inputted as the reception data rate to the controller 40.

The speech coding section 7 subjects the demodulation data outputted from the CDMA signal processing section 6 to an expanding process according to the reception data rate reported from the controller 40 and then to a decoding process using Viterbi decoding or the like and an error corrective decoding process, thereby reproducing the reception digital data in the base band.

A PCM coding section 8 carries out a different signal process, depending on the type of communication outputted from the controller 40, for example, whether the type of communication is audio communication or data communication.

Specifically, in audio communication, the reception digital data outputted from a speech coding section 7 is PCM-decoded, thereby outputting an analog receive signal. The analog receive signal is amplified by a receive amplifier 9 and then converted by a speaker 10 into greater sound energy, enabling the sound output to be audible over a large area.

In contrast, when information data, such as computer data or video data, is communicated, the receive digital data outputted from the speech coding section 7 is inputted via the bus 43 to the controller 40. The controller 40 outputs the receive digital data via the input/output interface 42 and further external interfaces 48 and 49 to a personal computer PC. The personal computer PC is composed of, for example, a Personal Digital Assistance (PDA) or a notebook-size personal computer.

Each of the external interfaces 48, 49 includes a connector mechanism for mechanically connecting the personal computer PC to the mobile radio communication terminal device and a modem for performing data transfer.

On the other hand, in audio communication, the voice inputted by the talker passes through a microphone 11, which converts it into an analog transmit signal and inputs this signal. The analog transmit signal is amplified by a transmit amplifier 12 to a suitable level and then subjected to PCM coding at the PCM coding section 8, which then inputs the coded signal as transmit data to the speech coding section 7.

In contrast, information data, such as computer data or video data, outputted from the personal computer PC is inputted via the external interfaces 49, 48 and the input/output interface 42 to the controller 40. The controller 40 then supplies the data via the PCM coding section 8 to the speech coding section 7.

In audio communication, the speech coding section 7 senses the amount of energy of the inputted sound from the transmitted audio data outputted from the PCM coding section 8 and, on the basis of the result of the sense, determines the data rate. Then, the transmitted data is compressed into a burst signal in the format according to the data rate. The burst signal is subjected to an error-correcting coding process and the resulting signal is outputted to the CDMA signal processing section 6. In data communication, the transmitted data outputted from the PCM coding section 8 is compressed into a burst signal in the format according to a preset data rate. The burst signal is further subjected to an error-correcting coding process and the resulting signal is outputted to the CDMA signal processing section 6. In both audio communication and data communication, any data rate is notified as transmission data rate to the controller 40.

Using the PN code allocated to the transmission channel, the CDMA signal processing section 6 performs a diffusion process on the burst signal compressed at the speech coding section 7. The transmission signal diffusion-coded is further subjected to an orthogonal modulation process. The orthogonal modulation signal is outputted to a transmission circuit (TX) 5.

The transmission circuit 5 combines the orthogonal modulation signal with the transmission local oscillation signal generated by a frequency synthesizer 4, thereby converting the orthogonal modulation signal into a radio frequency signal. Then, the transmission circuit 5 high-frequency amplifies only the effective part of the radio frequency signal on the basis of the transmission data rate TC specified by the controller 40 and outputs the amplified signal as a transmission radio-frequency signal. The transmission radio-frequency signal outputted from the transmission circuit 5 is supplied via the antenna duplexer 2 to the antenna 1. The antenna 1 transmits the transmission radio-frequency signal toward the base station.

The controller 40 is composed of, for example, a microcomputer and includes not only an ordinary control function of performing radio connection control or communication control with the base station but also a state determining function 40a of determining the state of its own station and base-station searching control means 40b for controlling the operation of searching for the base station on the basis of the result of the determination at the state determining function 40a.

The storage section 41 attached to the controller 40 is provided with a handover history storage section 41a. The handover history storage section 41a is composed of a first memory and a second memory. In the first memory, up to five pieces of information about handover destination base stations are stored, starting with the newest one, each time a new handover is effected. In the second memory, pieces of information about past five consecutive handover destinations are stored.

On the basis of the handover history information stored in the handover history storage section 41a, the state determining means 40a determines whether any of the base stations to which a specific number of past consecutive handovers including the present handover were connected has become a handover connection destination once or more. On the basis of the result of the determination, it is determined whether the present station is in the steady state or in the moving state.

A basic station search control means 41b chooses a different search algorithm according to either the steady state or the moving state, depending on the result of the determination by the state determining means 41a, thereby searching for a base station.

Specifically, in the steady state, four base stations whose histories have been stored as handover destinations in the handover history storage section 41a are put together into a first search group acting as a priority search object. The other individual base stations are put together into a second search group acting as an ordinary search object. The first search group is searched for more frequently than the second search group.

The reason why the number of base stations in the first search group acting as the priority search object is four is that the number of base stations most likely to hand over to mobile stations in the steady state is generally about four.

In the moving state, on the basis of the neighbor list message reported from the base station to which the present station is now being connected, or the base station in the active set state, eight neighboring base stations closer in distance to the base station now being connected are put together into a third search group acting as a priority search object. The remaining neighboring base stations in the list are put together into a fourth search group. The third search group is searched for more frequently than the fourth search group.

The reason why the number of neighboring base stations in the third search group acting as a priority search object is eight is that selection of eight neighboring base stations in the neighbor list message in the order of description generally enables a total of three cells including the cell in which the present station exists to be included in the search object.

Numeral 44 indicates a key unit. In the key unit 44, a key group, including a dial key, a call originating key, a power key, a communication end key, a volume control key, and a mode specify key are provided. Numeral 45 is an LCD display. On the LCD display, the telephone number of the called party's terminal, various operating states of the device, and information data to be transmitted and received, and others are displayed. After a ringing signal outputted from the input/output interface 42 is amplified by an amplifier 46 and supplied to a sounder 47, which outputs call incoming sound.

Numeral 31 indicates a power supply circuit. The power supply circuit 31 generates a specific operating power-supply voltage Vcc on the basis of the output of a battery 30 and supplies the voltage to each circuit section.

Figure 9:
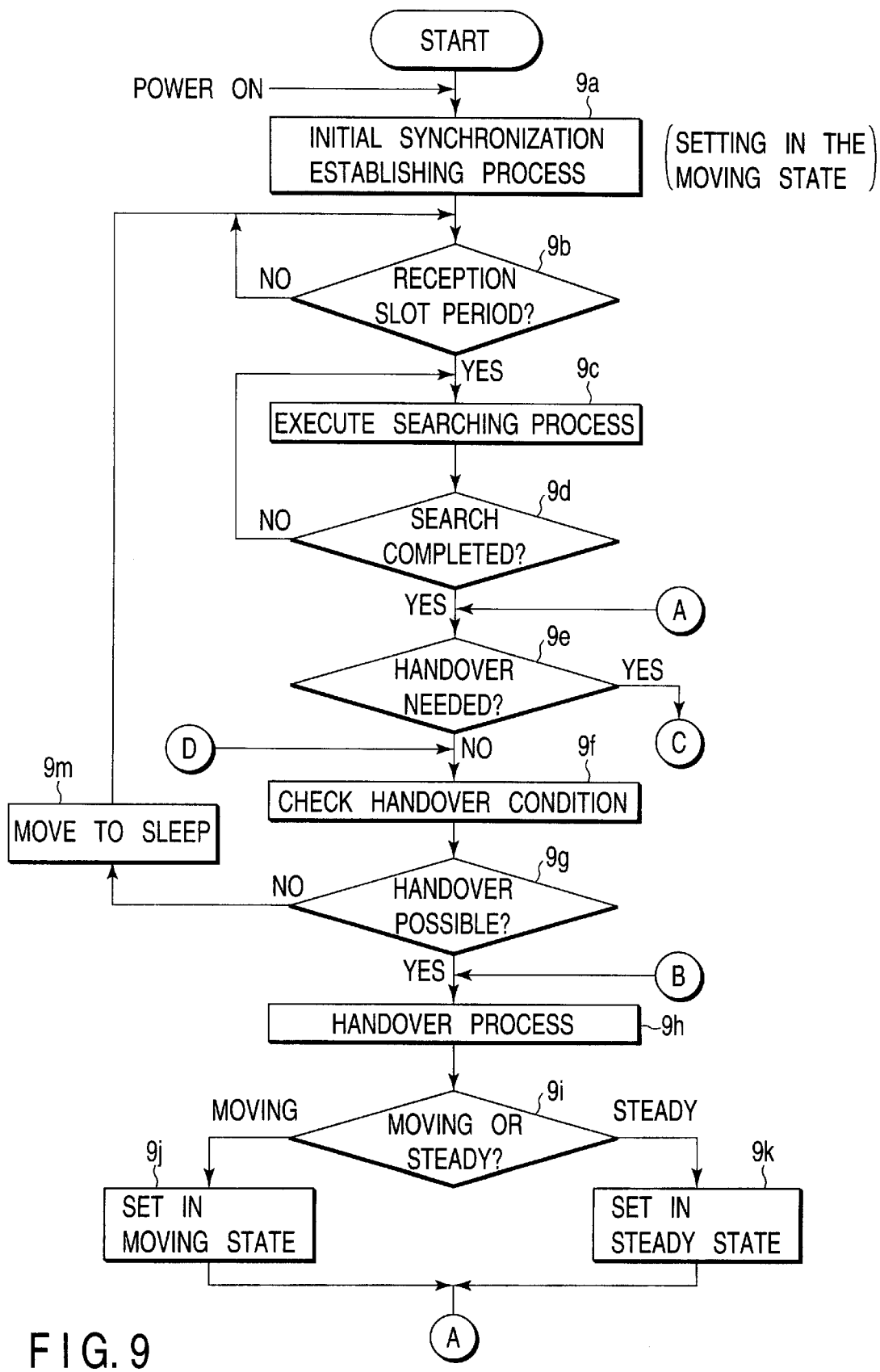
FIG. 9 is a flowchart to help explain the first half of the procedure for searching for a base station in the mobile radio communication terminal device of FIG. 2.
Figure 10:
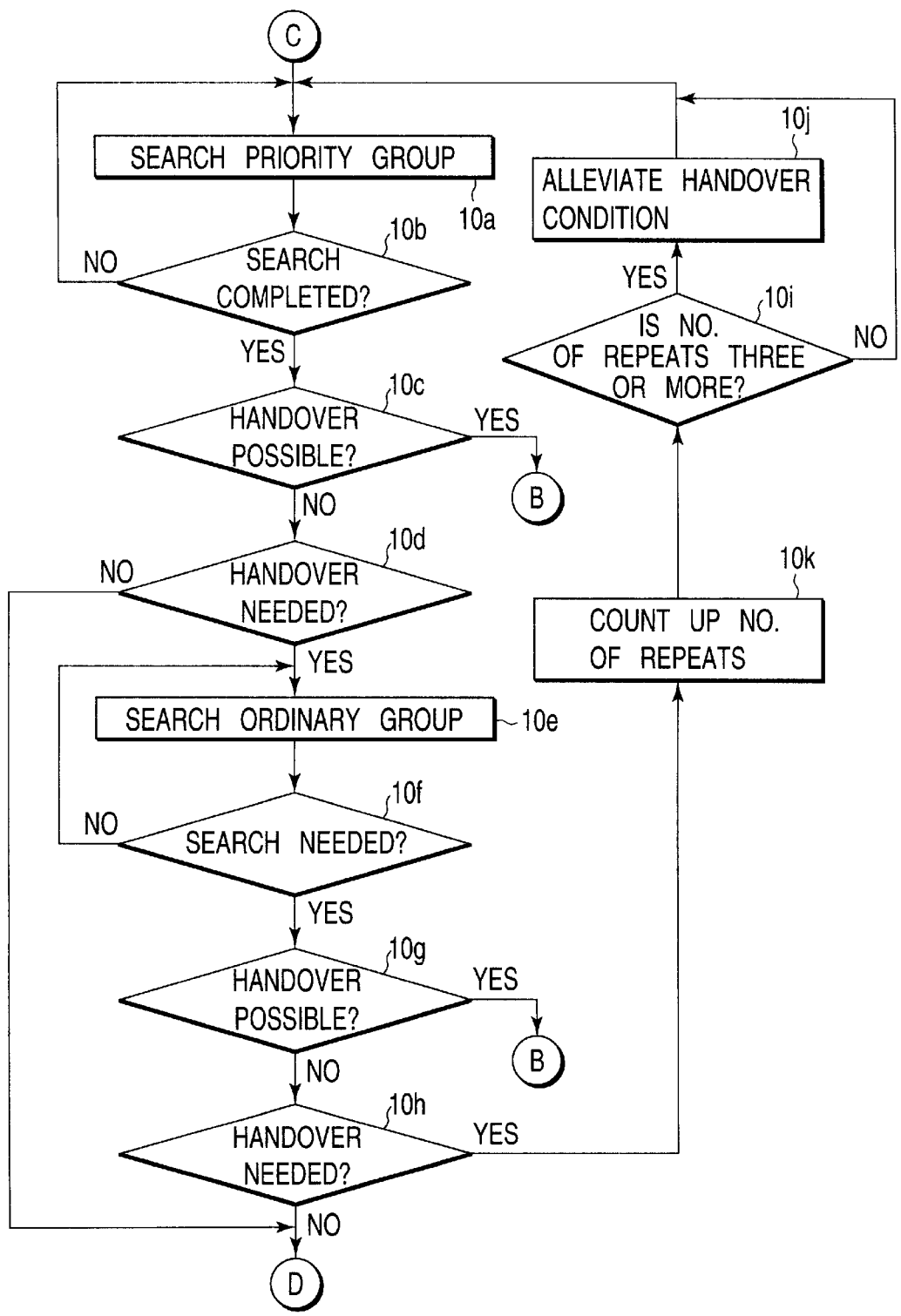
FIG. 10 is a flowchart to help explain the second half of the procedure for searching for a base station in the mobile radio communication terminal device of FIG. 2.

Next, the way a mobile station MS constructed as described above searches for a base station will be explained. FIGS. 9 and 10 are flowcharts to help explain the procedure and contents of control.

Figure 4:
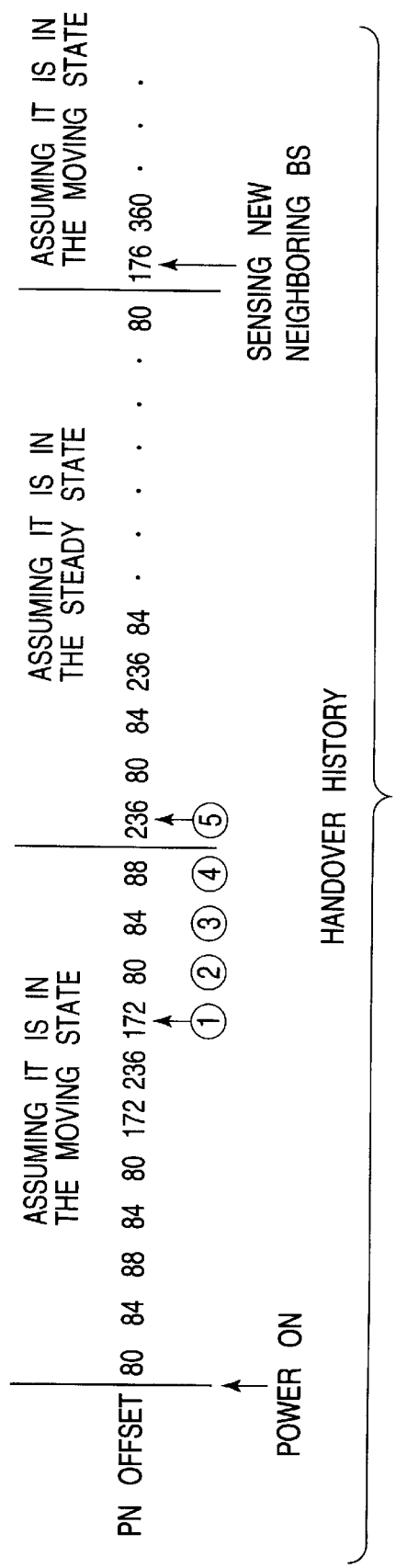
FIG. 4 is a diagram to help explain the operation of determining the state of a mobile station on the basis of the history of handover.

When the power switch (not shown) is turned on, the mobile station MS first executes the process of establishing initial synchronization at step 9a. Specifically, first, the mobile station picks up the pilot signal broadcast by a base station and then establishes PN coding synchronization with the base station. Then, the mobile station changes the Walsh code, thereby receiving the sync channel transmitted by the base station. The mobile station then receives and demodulates the message transmitted through the sync channel and stores the resulting information. The message includes the information inherent to the base station and network. In establishing the initial synchronization, the mobile station assumes itself to be in the moving state as shown in FIG. 4.

After finishing the synchronization establishing sequence, the mobile station MS goes into the wait state. In the wait state, the mobile station MS carries out a slot mode operation. Specifically, at step 9b, the mobile station MS monitors the slot period it should receive. Then, when the reception slot period has been reached, the mobile station proceeds to step 9c, where it monitors the arrival of the page massage addressed to itself and then searches for neighboring base stations.

Figure 3:
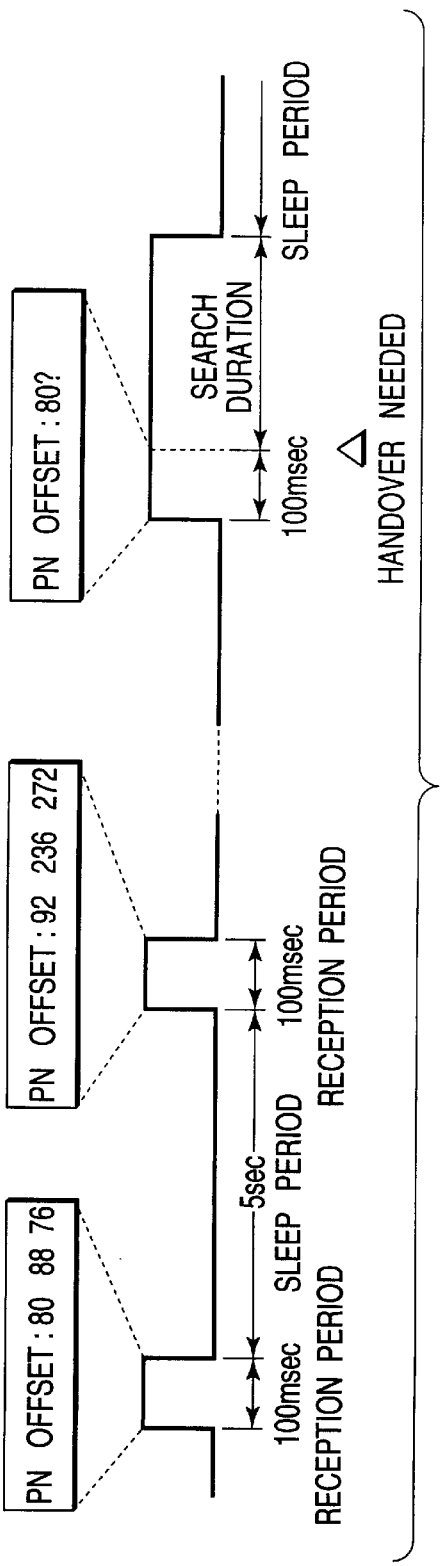
FIG. 3 is a timing diagram to help explain the operation of searching for a base station in the slot mode.

FIG. 3 is a timing chart showing an example of the slot mode operation. In the figure, the reception slot period lasts 100 milliseconds. In the reception slot period, the monitoring of the arrival of the page message addressed to the present mobile station and the searching of three neighboring base stations are done. The interval between reception slot periods, or the sleep period, is 5 seconds long.

After having searched for base stations in one reception slot period, the mobile station MS moves from step 9d to step 9e, where it is determined whether handover is needed. The determination whether or not handover is needed is made as follows. The reception electric-field strength level of the radio frequency signal arriving from the base station now being connected is sensed. The reception electric-field strength level sensed is compared with a preset determination level. If the reception electric field strength level sensed is equal to or higher than the determination level, handover is determined not to be needed. If the reception electric-field strength level sensed is lower than the determination level, handover is determined to be needed.

Now, it is assumed that the reception electric field strength level of the radio frequency signal arriving from the base station now being connected is high and the controller 40 has determined that handover is not needed. In this case, the mobile station MS, at step 9f, selects the base station with the best handover condition, on the basis of the result of searching for base stations in the preceding reception slot period. Then, the mobile station compares the condition of the selected base station with that of the base station now being connected and determines at step 9g whether handover is possible, or whether handover should be effected. Then, the condition of the reception from the base station now being connected is better, the mobile station determines that handover is not needed and goes to step 9m, where it goes into the sleep state.

In contrast, when the neighboring base station is better in the reception condition than the base station now being connected, the mobile station determines that handover should be effected and goes to step 9h, where the mobile station executes the handover process. In the handover process, the controller 40 determines whether information about the base station at the handover destination has been stored in the first memory of the handover history storage section 41a.

The first memory is a memory for storing only information on new handover destinations.

If information on the base station at the handover destination has not been stored in the first memory, the controller 40 regards the base station as a new handover destination and additionally stores the information in the first memory. Information about the handover destination is stored as it is in the second memory that stores past five handover destinations in sequence. FIGS. 5A and 5B show examples of pieces of information stored in the first memory and second memory, respectively.

After having finished the handover process, the mobile station MS proceeds to step 9i, where it determines whether it is in the moving or steady state. The determination of the state is made on the basis of the pieces of information stored in the first and second memories of the handover history storage section 41a. Specifically, the mobile station determines whether the destination to which handover was just connected has not been registered in the first memory and is new. If it is new, the mobile station determines that it is in the moving state. On the other hand, if the destination to which handover was just connected has been already registered in the first memory, the mobile station determines whether the destinations to which the past five consecutive handovers were connected have all been registered in the first memory. If they have been registered, the mobile station determines that it is in the steady state.

For example, it is assumed that the handover history information about the mobile station MS is as shown in FIGS. 5A and 5B. In this situation, the mobile station determines that it is changed from the moving state to the steady state at the time when handover is effected to the base station with PN offset (236) as shown in FIG. 4. Furthermore, the mobile station returns from the steady state to the moving state at the time when handover is effected to the base station with PN offset (176) at a new handover destination.

On the basis of the result of determining the state, the search algorithm according to the moving state and the search algorithm according to the steady state are set at step 9j and step 9k, respectively. Thereafter, the mobile station MS executes the process of searching base stations according to the set search algorithms.

Specifically, in the steady state, four handover destinations of those already registered in the first memory are selected and put together into a first search group acting as a priority search object. The other base stations not included in the first search group are put together into a second search group.

For example, it is assumed that the mobile station MS is connected to base station BSa3 and the handover destination information shown in FIG. 5A has been registered in the first memory. In this situation, the mobile station MS selects four base stations with PN offsets (80), (88), (236), and (172) as the first search group and the other base stations with PN offsets (76), (92), . . . as the second search group.

The number of base stations constituting the first search group and the number of base stations constituting the second search group are arbitrary, provided that the number of base stations in the second search group is larger than the number of base stations in the first search group.

Figure 7:
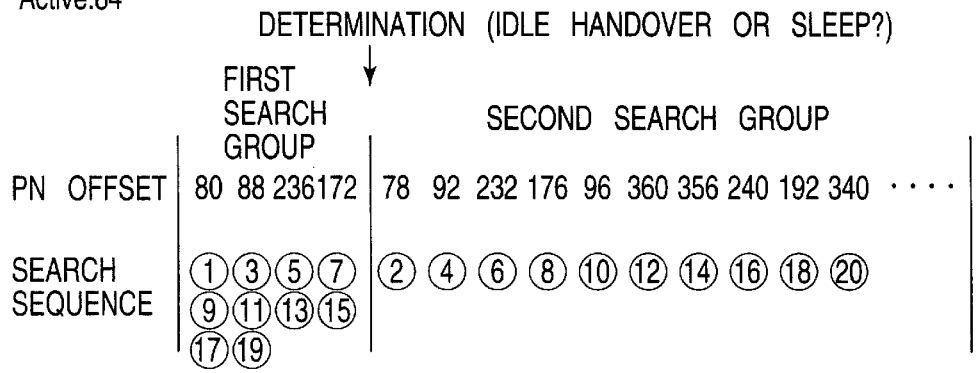
FIG. 7 is a diagram to help explain the operation of searching for a base station in the steady state.

Thereafter, the base stations included in the first search group and the base stations included in the second group are searched for one by one alternately in the order of the circled numbers ①, ②, ③, . . . in FIG. 7 each time its own reception slot period is reached. The first search group is searched for earlier than the second search group and the number of base stations included in the first search group is smaller than the number of base stations included in the second search group. As a result, the base stations in the first search group are given priority in search over the base stations in the second search group and are searched more frequently than the latter.

Consequently, a sector with a strong possibility that the mobile station MS exists is mainly searched for, which makes it possible to find the best handover destination with a high probability in effecting handover. Although the first search group is given priority in search over the second search group, the base stations in the second search group never fail to be searched for once each time a reception slot is reached, because the base stations in the first search group and those in the second search group are searched for one by one alternately. This prevents the result of searching for the base stations in the second search group from becoming too old, which makes it possible to find a suitable handover destination with a relatively high probability, when handover is needed in the mobile station MS.

On the other hand, in the moving state, the mobile station selects eight base stations in the order in which they are closer to the present base station, on the basis of the neighbor list message reported by the base station now being connected. These eight base stations are put together into a third search group acting as a priority search object. Of the base stations whose PN offsets are written in the neighbor list message, all the base stations not included into the third search group are put together into a fourth search group.

For example, it is assumed that the mobile station MS is connected to base station BSa3 given PN offset (84) and the base station BSa3 notifies a neighbor message as shown in FIG. 6. In this situation, the mobile station MS as shown in FIG. 8 selects eight base stations with PN offsets (80), (88), (76), (92), (236), (232), (172), and (176) in the neighbor list and classifies them into the third search group and the other base stations in the neighbor list into the fourth search group.

The number of base stations constituting the third search group and the number of base stations constituting the fourth search group are arbitrary, provided that the number of base stations in the fourth search group is larger than the number of base stations in the third search group.

Figure 8:
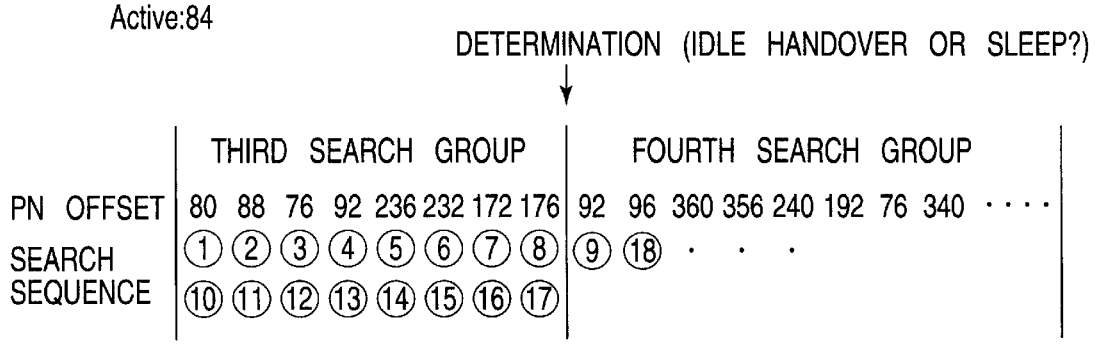
FIG. 8 is a diagram to help explain the operation of searching for a base station in the moving state.

Thereafter, all the base stations included in the third search group and each base station included in the fourth group are searched for one by one alternately in the order of the circled numbers ①, ②, ③, . . . in FIG. 8 each time its own reception slot period is reached. As a result, each base station in the third group is given priority in search over the base stations in the fourth search group and is searched for more frequently than the latter. In addition, the third search group is searched for intensively. Consequently, search information about a base station most likely to become the destination to which the mobile station MS moves can be acquired in a relatively short time. As a result, when handover is needed, the best handover destination can be found with a high probability.

The number of base stations selected from the fourth search group is not necessarily limited to one and may be set to any number, provided that it is smaller than the number of base stations in the third search group.

Next, the search operation when it has been determined at step 9e that handover is needed will be described.

It is assumed that the reception electric-field strength sense level of the radio frequency signal coming from the base station now being connected has dropped below a determination level and therefore the controller 40 has determined that handover is needed. In this situation, the mobile station MS continues the search without going into the sleep state as shown in FIG. 3.

Specifically, as shown in FIG. 10, at step 10a, the priority search group is searched according to the state of the mobile station at that time.

For example, when the mobile station MS is in the steady state, each of the four base stations in the first search group is searched for. In contrast, when the mobile station MS is in the moving state, each of the eight stations in the third search group of FIG. 8 is searched for.

After having searched the first or third search group acting as the priority search group, the mobile station MS moves from step 10b to step 10c, where it determines whether there is a base station that fulfills the condition for the handover destination, on the basis of the latest result of searching the priority search group. Then, if there is a base station that fulfills the condition, the mobile station returns to step 9h, where it executes the handover process.

In contrast, if no base station that fulfills the condition has been found from the priority search group, the mobile station MS senses the reception electric-field strength of the radio frequency signal coming from the base station now being connected and checks again to see if the sense level is still below the determination level. If it is still below the determination level, the mobile station proceeds to step 10e, where it searches the second or fourth search group acting as the ordinary search group.

On the other hand, for example, when the result of the determination at step 9e is caused by a temporary drop in the reception electric-field strength and the determination at step 10d has shown that the reception electric-field strength sense level is restored to the determination level or above, the mobile station proceeds to step 9f without searching the ordinary search group. As a result, when the reception quality of the signal from the base station now being connected is restored, the ordinary search group is prevented from being searched wastefully, reducing the power consumption that much, which lengthens the battery service life.

After having searched the ordinary search group, the mobile station MS moves from step 10f to step 10g, where it determines whether there is any base station that fulfills the condition for the handover destination, on the basis of the latest result of searching the ordinary search group.

Then, if there is a base station that fulfills the condition, the mobile station returns to step 9*h* of FIG. 9 and executes the handover process.

In contrast, if no base station that fulfills the condition has been found in the ordinary search group, the mobile station MS, at step 10*h*, senses the reception electric-field strength of the radio frequency signal coming from the base station now being connected and checks again to see if the sense level is still below the determination level. If the reception electric-field strength sense level remains below the determination level, the mobile station returns to step 10*a*, where it searches the priority search group and the ordinary search group repeatedly.

In returning to the act of searching the priority search group, the mobile station, at step 10*k*, counts up the number of times the search is repeated and, at step 10*i*, determines the number of searches repeated. Then, when the number of repeats becomes, for example, three or more, the mobile station, at step 10*j*, performs control in such a manner that the determination level of the handover is decreased by, for example, 1 dB each time the search is repeated.

The alleviated handover determination condition is returned to the original determination condition before the alleviation, after the handover has failed and the system lost has occurred.

Now, it is assumed that the reception quality of the signal from the base station now being connected has been restored in the middle of the repetitive search. In this situation, the mobile station MS returns from step 10*h* to step 9*h* of FIG. 9.

As described above, with the present invention, the history of the handover destinations is stored in the handover history storage section 41*a*. Each time handover is effected, the history of past five consecutive handover destinations including the present one is determined on the basis of the handover history storage section 41*a*. When all the handover destinations have been stored in the handover history storage section 41*a*, the mobile station recognizes its state to be in the steady state. In the other cases, the mobile station recognizes its state to be in the moving state. On the basis of the recognition, the mobile station selects a search algorithm suitable for each state and searches for a base station.

Since the state of the present station is determined by tracing the history of past handovers, it is possible to determine accurately whether the present station is in the moving state or in the steady state and further to carry out the operation of searching for the best base station in each state.

Specifically, in the steady state, the five handover destinations stored in the handover history storage section 41*a* are classified into the first search group and the other stations are classified into the second search group. The first search group is searched more frequently than the second search group.

On the other hand, in the moving state, on the basis of the neighbor list message reported from the base station to which the present station is now being connected, eight neighboring base stations closer in distance to the base station now being connected are classified into the third search group. The remaining neighboring base stations in the list are classified into the four search group. The third search group is searched more frequently than the fourth search group.

With this approach, for example, in the steady state, since the mobile station MS is stationary or moving slowly in a limited range, it can find the suitable base station as the handover destination by just searching for a limited number of base stations, such as three or four base stations. Therefore, as compared with the case where a large number of neighboring base stations are searched for unconditionally, a suitable handover destination can be found in a shorter search time. This shortens the search time, reducing the power consumption that much, which lengthens the battery service life.

In the moving state, the best base station for the handover destination changes dynamically. Because of this, in the moving state, neighboring base stations are searched for over a relatively wide range according to the neighbor list message reported from the base station now being connected, which makes it possible to find a suitable base station as the handover destination with a high probability.

Since the base stations in the first search group and those in the second search group are searched for one by one alternately, the base stations in the second search group never fail to be searched for once each time reception slot is reached. This prevents the result of searching for the base stations in the second search group from becoming too old, which makes it possible to find a suitable handover destination with a relatively high probability, even when the mobile station MS moves suddenly.

Furthermore, when a suitable base station could not be found as the handover destination as the result of searching the first search group and second search group, a determination whether or not handover is needed is made again. Only when the result of the determination has shown that handover is needed, the second search group and fourth search group are searched.

Therefore, when the reception quality has been restored and handover is not needed, the mobile station can return to the sleep state without searching the second search group. Therefore, as compared with the case where the search of the first and second search groups is continued unconditionally, a useless search is eliminated, thus reducing the power consumption that much, which lengthens the battery service life.

Furthermore, in a case where a suitable base station could not be found as the handover destination as the result of searching the first or third search group and the second or fourth search group, the first or third search group and the second or fourth search group are searched repeatedly and, when handover becomes unnecessary in the course of repeating the search three times or more, control is performed in such a manner that the handover determination condition is alleviated.

Therefore, when a possibility of handover is checked excessively because the handover determination condition has not been optimized, the handover determination condition can be corrected automatically to the optimum condition. As a result, a base station is searched for only when handover is really needed, reducing the power consumption, which lengthens the battery service life.

The present invention is not limited to the above embodiment. For example, while explanation has been given using the CDMA cellular radio communication system, the means for determining whether the mobile station is in the steady state or the moving state may be applied to a TDMA cellular radio communication system or a cellular radio communication system of the analog type, such as the AMPS scheme.

Furthermore, as for the system configuration, the configuration of a mobile station, the procedure for and the contents of the state determination means and base station search control means, the configuration of the handover history storage means, and others, the present invention may be practiced or embodied in still other ways without departing from the spirit or essential character thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio communication terminal device for use in a cellular mobile radio communication system where base stations are distributed over a service area, the base stations form their respective radio areas, and a radio channel connects the mobile radio communication terminal device and a base station in each of the radio areas, comprising:

history information storage means for storing information relating to past handovers representing base stations connected to the mobile radio communication terminal device as handover history information;

update means for updating the handover history information stored in said history information storage means each time handover is performed; and state determining means for determining whether the mobile radio communication terminal device is in a steady state or a moving state, on the basis of the handover history information stored in said history information storage means.

2. The mobile radio communication terminal device according to claim 1, wherein, each time handover is performed, said state determining means determines whether any of the base stations connected to the mobile station by a specific number of past successive handovers including the present handover became a destination base station connected to the mobile station in the past, on the basis of the handover history information stored in said history information storage means, and when determining that any of the base stations became the handover destination base station, recognizes the mobile radio communication terminal device to be in the steady state and, in contrast, when determining that at least one of the base station did not become the handover destination base station, recognizes its own mobile radio communication terminal device to be in the moving state.

3. The mobile radio communication terminal device according to claim 1, further comprising base station searching means for selecting a search algorithm, depending on either the steady state or the moving state, according to the result of the determination by said state determining means and searches for a base station according to the selected search algorithm.

4. The mobile radio communication terminal device according to claim 3, wherein said base station searching means, in the steady state, classifies a first number of base stations in the handover destination base stations stored in said history information storage means into a first search group and a second number of the other base stations larger than said first number into a second search group and that the first search group is given priority in search over the second search group.

5. The mobile radio communication terminal device according to claim 4, wherein said base station searching means includes necessity determining means for determining whether handover is needed and that when the necessity determining means determines that handover is not needed, each base station belonging to said first search group and each base station belonging to said second search group are searched for alternately.

6. The mobile radio communication terminal device according to claim 4, wherein said base station searching means includes necessity determining means for determining whether handover is needed and that when the necessity determining means determines that handover is needed, all the base stations belonging to the first search group are searched for and, when a suitable base station is not be found as the result of the search, each base station belonging to the second search group is searched for.

7. The mobile radio communication terminal device according to claim 6, wherein, when a suitable base station is not be found as the handover destination as the result of the search of the first search group, said base station searching means causes said necessity determining means to determine again whether handover is needed and, only when the determination determines that handover is needed, searches the second search group.

8. The mobile radio communication terminal device according to claim 6 or 7, wherein, when a suitable base station is not be found as the handover destination as the result of searching the first search group and the second search group, said base station searching means searches the first search group and the second search group repeatedly.

9. The mobile radio communication terminal device according to claim 8, wherein said base station searching means counts the number of times the first search group and the second search group are searched repeatedly and, when the number of repetitions becomes a predetermined number of times, performs variable control of the determination conditions of said necessity determining means.

10. The mobile radio communication terminal device according to claim 3, wherein said base station searching means, in the moving state, selects a third number of neighboring base stations closer in distance to the base station connected to the mobile radio communication terminal device, on the basis of a list of neighboring base stations reported from the connected base station classifies these neighboring base stations into a third search group and the other neighboring base stations in said list into a fourth search group, and gives priority in search to the third search group over the fourth search group.

11. The mobile radio communication terminal device according to claim 10, wherein said base station searching means includes necessity determining means for determining whether handover is needed and that when the necessity determining means determines that handover is not needed, the third number of neighboring base stations belonging to said third search group and the fourth number of neighboring base stations smaller than said third number selected from said fourth search group are searched for alternately.

12. The mobile radio communication terminal device according to claim 10, wherein said base station searching means includes necessity determining means for determining whether handover is needed and that when the necessity determining means determines that handover is needed, all the base stations belonging to the third search group are searched for and, when a suitable base station is not be found as the result of the search, each base station belonging to the fourth search group is searched for.

13. The mobile radio communication terminal device according to claim 12, wherein, when a suitable base station is not be found as the handover destination as the result of the search of the first search group, said base station searching means causes said necessity determining means to determine again whether handover is needed and, only when the determination determines that handover is needed, searches one base station of the fourth search group.

14. The mobile radio communication terminal device according to claim 12 or 13, wherein, when a suitable base station is not be found as the handover destination as the result of searching the third search group and the fourth search group, said base station searching means searches the third search group and the fourth search group repeatedly.

15. The mobile radio communication terminal device according to claim 14, wherein said base station searching means counts the number of times the third search group and the fourth search group are searched repeatedly and, when the number of repetitions becomes a predetermined number of times, performs variable control of the determination conditions of said necessity determining means.

16. A mobile communication terminal device for use in a cellular mobile radio communication system where base stations are distributed over a service area, the base stations form their respective radio areas, the mobile communication terminal device and a base station are connected by radio in each of the radio areas, comprising:

history information storage means for storing information relating to past handovers representing base stations connected to the mobile radio communication terminal device as handover history information;

means for updating the handover history information stored in said history information storage means each time handover is performed; and base station search control means for controlling the operation of searching for said base stations on the basis of the handover history information stored in said history information storage means.

17. A mobile terminal, coupled through a radio channel to at least one base station, said mobile terminal comprising:

a memory that stores history information relating to handovers between the mobile terminal and at least one base station;

first logic that updates the handover history information stored in the memory each time handover is performed; and second logic that determines whether the mobile terminal is in a steady state or a moving state, using the handover history information.

18. A communication system, comprising:

one or more base stations distributed over a service area; and a mobile terminal, coupled through a radio channel to at least one of the base stations, said mobile terminal including a memory that stores information relating to handovers between the mobile terminal and at least one base station, first logic that updates the handover history information stored in the memory each time handover is performed, and second logic that controls the operation of searching for the at least one base station using the handover history information.

* * * * *